United States Patent
Schueller

(10) Patent No.: US 10,220,909 B2
(45) Date of Patent: Mar. 5, 2019

(54) CABLE OPERATED LEFT-HAND REAR BRAKE SYSTEM

(71) Applicant: Charles Robert Schueller, Lakewood, CO (US)

(72) Inventor: Charles Robert Schueller, Lakewood, CO (US)

( * ) Notice: Subject to any disclaimer, the term of this patent is extended or adjusted under 35 U.S.C. 154(b) by 0 days.

(21) Appl. No.: 15/649,560

(22) Filed: Jul. 13, 2017

(65) Prior Publication Data

US 2018/0015983 A1    Jan. 18, 2018

Related U.S. Application Data

(60) Provisional application No. 62/361,950, filed on Jul. 13, 2016.

(51) Int. Cl.
*B62L 3/02* (2006.01)

(52) U.S. Cl.
CPC .................................. *B62L 3/023* (2013.01)

(58) Field of Classification Search
CPC ............. B62L 3/023; B62L 3/08; B62K 11/00
USPC .... 188/2 D, 24.22, 24.11; 74/481, 488, 489, 74/491, 501.6, 502.2, 504, 506, 511 R, 74/531, 538, 539
See application file for complete search history.

(56) References Cited

U.S. PATENT DOCUMENTS

| | | | |
|---|---|---|---|
| 7,621,380 B2* | 11/2009 | Wolfe | B60T 7/06 188/2 D |
| 7,722,130 B2* | 5/2010 | Takeuchi | B62L 3/023 188/106 P |
| 8,393,430 B2* | 3/2013 | Matsuzawa | B60T 11/046 180/219 |
| 2008/0011563 A1* | 1/2008 | Yamamoto | B60T 7/104 188/265 |
| 2014/0008139 A1* | 1/2014 | Inoue | B62L 3/08 180/219 |

FOREIGN PATENT DOCUMENTS

WO    WO-2015/152837 A1 *  10/2015

* cited by examiner

*Primary Examiner* — Pamela Rodriguez

(57) ABSTRACT

A cable operated left-hand rear brake system for off-road motorbikes and closed-course motorbikes consists of a handlebar-mounted brake lever, a brake cable, a cable perch, and a cable adapter. The handlebar-mounted brake lever provides the user with an alternative method to apply the rear brakes in addition to the existing foot lever. The brake cable is connected to the handlebar-mounted brake lever at a first end and the cable adapter at a second end. The cable adapter is mounted to the existing braking system of the motorbike. Therefore, when the user intends to apply the rear brakes, the handlebar-mounted brake lever is compressed such that the cable adapter pivots to control the existing braking system. The cable perch is used to position and guide the brake cable from the handlebar-mounted brake lever to the cable adapter.

9 Claims, 10 Drawing Sheets

US 10,220,909 B2

CABLE OPERATED LEFT-HAND REAR BRAKE SYSTEM

The current application claims a priority to the U.S. Provisional Patent application Ser. No. 62/361,950 filed on Jul. 13, 2016.

FIELD OF THE INVENTION

The present invention relates generally to a motorcycle braking system. More specifically, the present invention introduces a rear brake system that is hand controlled and is intended to be in off-road motorbiking and closed-course motorbiking.

BACKGROUND OF THE INVENTION

The increased popularity in motorsports has resulted in a significant number of modifications introduced to cars and motorbikes participating in the sport. The modifications are meant to increase the safety of the driver/rider and obtain an advantage over a car/motorbike with no such modifications. The body, the transmission, and the braking system are some of the areas that are significantly modified in the motorsport industry. The present invention is related to the braking system of motorbikes that are used for off-road motorbiking and closed-course motorbiking.

Generally, when a braking system of a motorbike is modified, significant changes are made to the existing braking system. The process of changing an existing braking system can be financially disadvantageous and time consuming. Moreover, changing the original equipment manufacturer (OEM) brakes with an alternative braking system can raise safety concerns and might not meet certain safety standards. Therefore, an alternative braking system that can be installed conveniently without affecting the OEM brakes is clearly needed.

The inability to be used with a wide variety of bikes is another issue with many existing alternative braking systems. For instance, some braking systems can be used with 2-stroke bikes but cannot be used with 4-stroke bikes or vice versa. In another instance, the alternative braking system is limited only to motorbikes with a manual clutch system or limited only to motorbikes with an automatic clutch system. Thus, there exists a need for an alternative braking system that can be used universally for all types of motorbikes.

The objective of the present invention is to address the aforementioned issues. In particular, the present invention is a braking system that can be used as a retrofit without making any change to the existing braking system. The effective design allows the present invention to be used with motorbikes that utilize a manual clutch system as well as an automatic clutch system. Thus, the present invention can be used with a wider variety of motorbikes compared to other alternative braking systems.

BRIEF DESCRIPTION OF THE DRAWINGS

FIG. 5 is an exploded view of the cable perch, the cable adapter, and the existing braking system the present invention is being used on.

DETAIL DESCRIPTIONS OF THE INVENTION

All illustrations of the drawings are for the purpose of describing selected versions of the present invention and are not intended to limit the scope of the present invention.

The present invention introduces a braking system to be used in off-road motorbikes and closed-course motorbikes. By utilizing the present invention, the user is provided with an extremely effective and functional auxiliary hand brake that is beneficial in technical riding conditions. Quick and easy installation, less handlebar clutter, and minimum maintenance are some of the other advantages the present invention has compared to other existing alternative braking systems.

Figure 1:
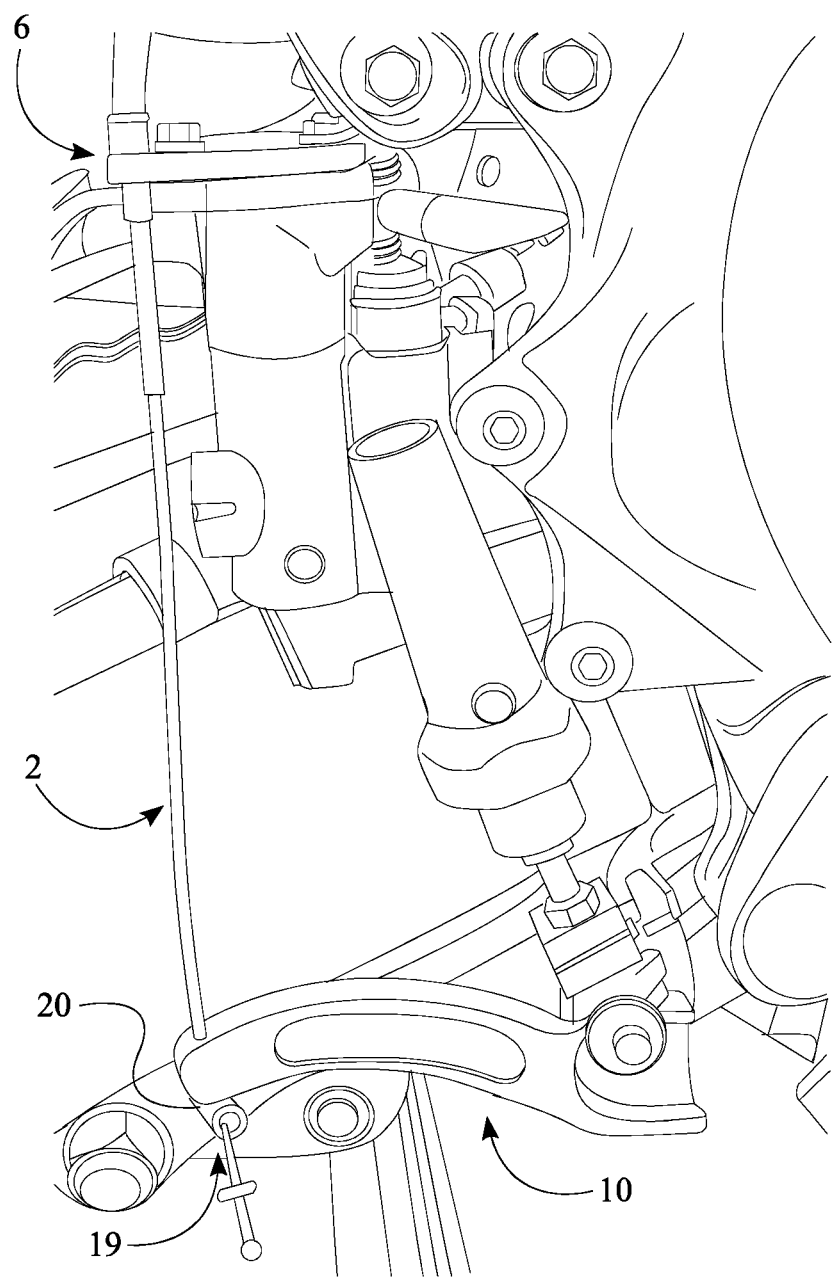
FIG. 1 is an illustration of the present invention being used on an existing braking system.
Figure 2:
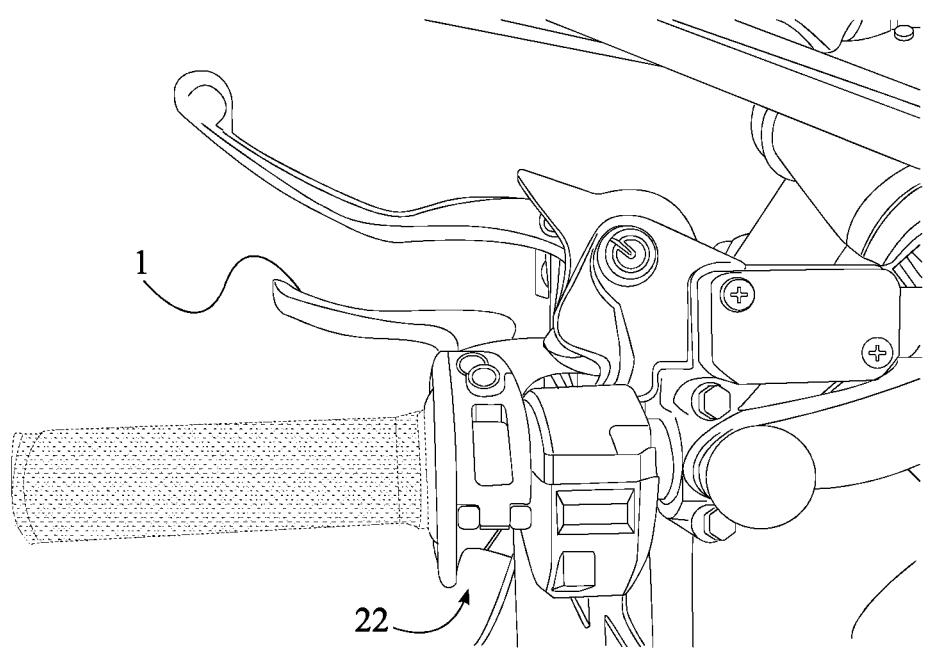
FIG. 2 is an illustration of the handlebar-mounted brake lever.

As seen in FIGS. 1-4, the cable operated left-hand rear brake system introduced by the present invention comprises a handlebar-mounted brake lever 1, a brake cable 2, a cable perch 6, and a cable adapter 10. The handlebar-mounted brake lever 1 is the mechanism that is utilized for applying the rear brake and releasing the rear brake. To do so, the handlebar-mounted brake lever 1 is mounted onto the handlebar of a motorbike the present invention is to be used on. More specifically, the handlebar-mounted brake lever 1 is mounted adjacent to the left-hand handle grip of the motorbike. If the motorbike has a manual clutch system, the handlebar-mounted brake lever 1 is mounted adjacent to the manual clutch as shown in FIG. 2. The present invention comprises a first attachment mechanism 22 that is used for mounting the handlebar-mounted brake lever 1 onto a handlebar.

The brake cable 2 is used for transferring the signal from the handlebar-mounted brake lever 1 to the braking mechanism of the motorbike. The cable perch 6 appropriately positions and guides the brake cable 2 so that the brake cable 2 can effectively be connected to the cable adapter 10 and control the cable adapter 10. By controlling the cable adapter 10, the existing braking system of the motorbike is triggered so that the brakes are appropriately applied or released. More specifically, the present invention is used to trigger a hydraulic brake system of a motorbike without making any modifications to the hydraulic cylinder or other related components.

Figure 3:
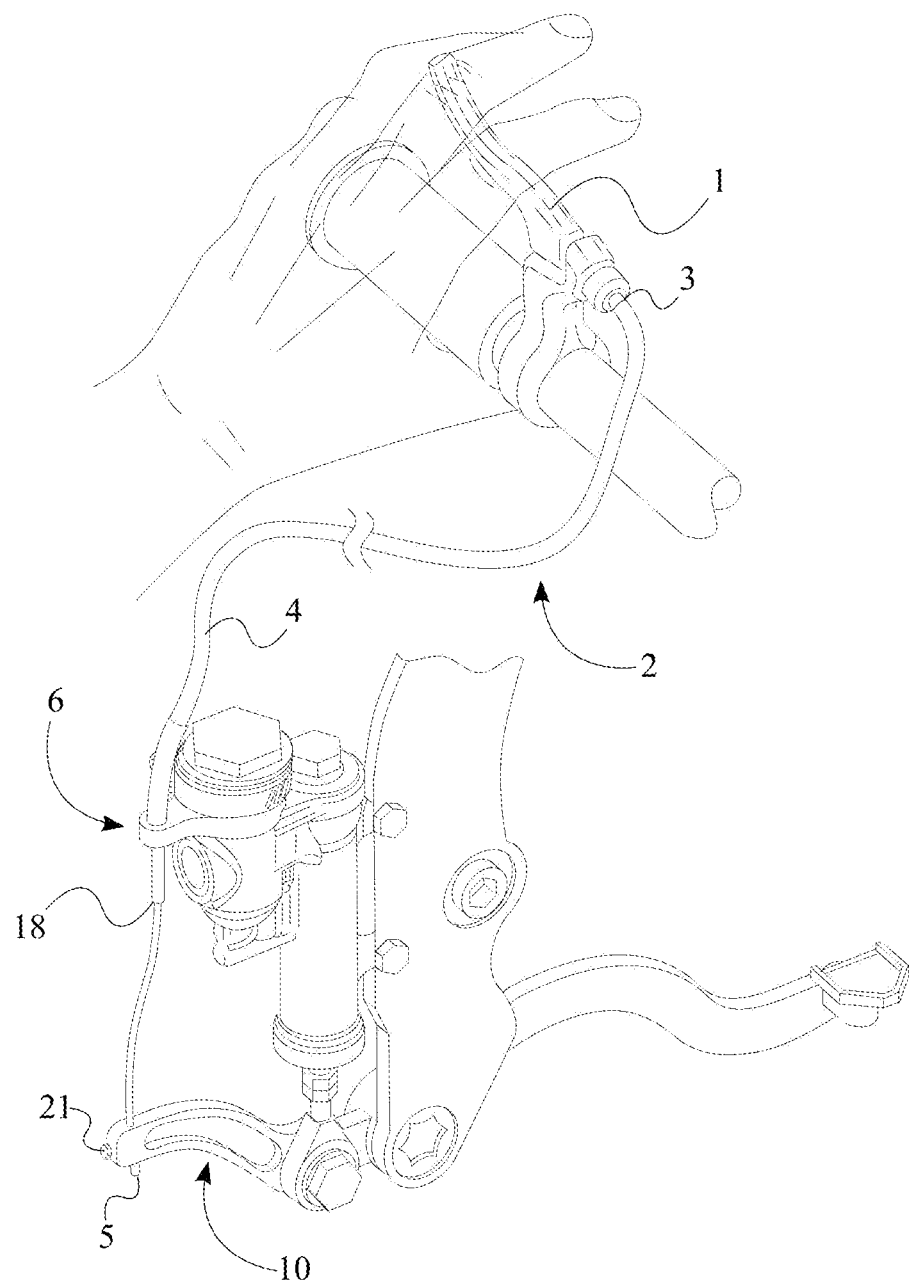
FIG. 3 is an illustration of the present invention is in use, wherein the handlebar-mounted brake lever is released.
Figure 4:
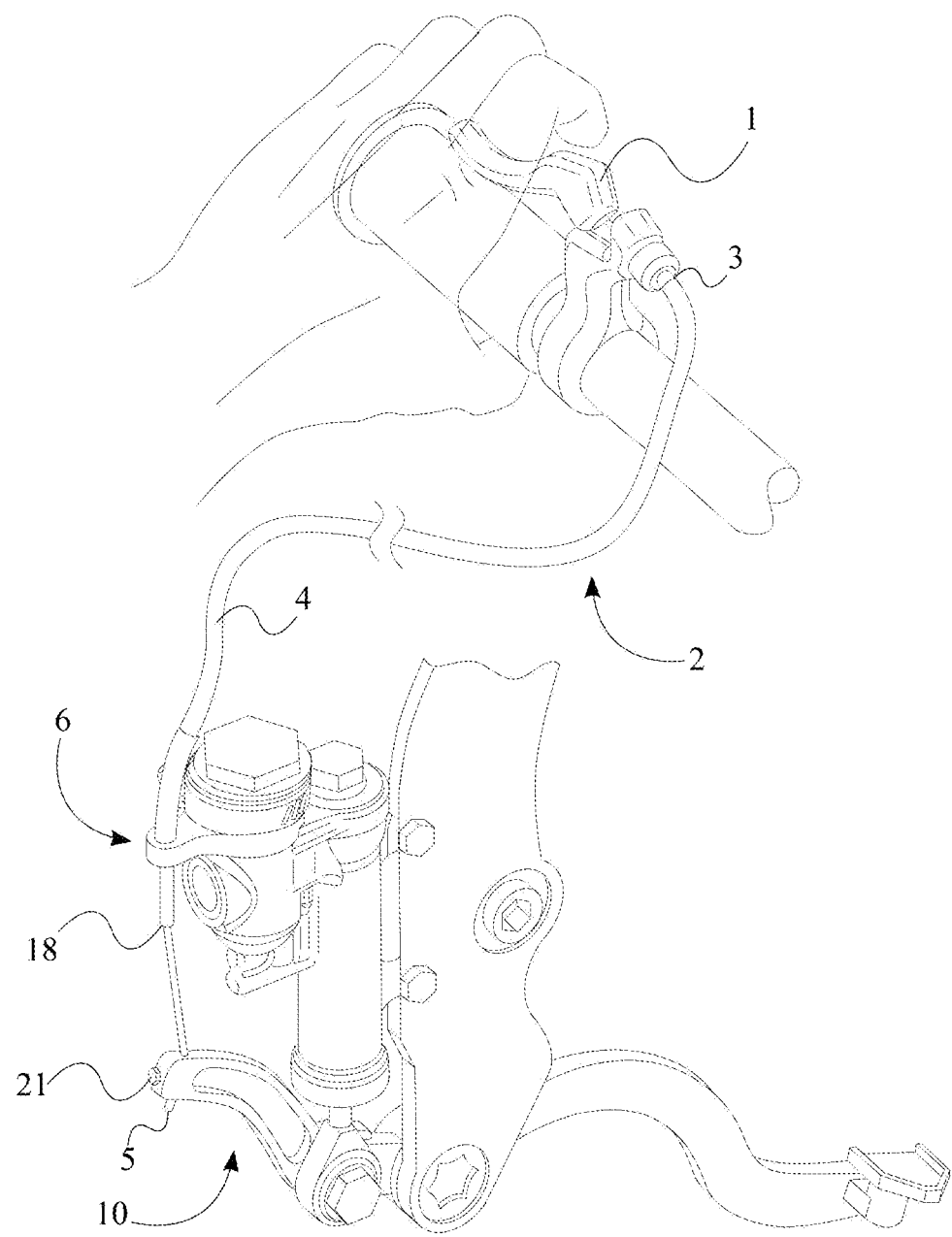
FIG. 4 is an illustration of the present invention is in use, wherein the handlebar-mounted brake lever is compressed.

To transfer the mechanical force from the user to the existing braking system of the motorbike, the brake cable 2 needs to be appropriately connected between the handlebar-mounted brake lever 1 and the cable adapter 10. To do so, the handlebar-mounted brake lever 1 is mechanically engaged with the cable adapter 10. As seen in FIG. 3 and FIG. 4, the brake cable 2, which is used to connect the handlebar-mounted brake lever 1 and the cable adapter 10, comprises a first end 3, a cable body 4, and a second end 5, wherein the cable body 4 extends from the first end 3 to the second end 5. The first end 3 is tensionably connected to the handlebar-mounted brake lever 1 and the second end 5 is tensionably connected to the cable adapter 10 via the cable perch 6. The tension maintained in the brake cable 2 allows the user to apply or release the brake with the use of the handlebar-mounted brake lever 1. The mechanical properties of the brake cable 2 and the length of the brake cable 2 can vary from one embodiment to another. As an example, the brake cable 2 used for a lightweight motorbike can be different from the brake cable 2 that is used for a considerably heavier motorbike. For longevity and safety purposes, the present invention further comprises a cable cover 18 for protecting the brake cable 2. The cable body 4 is sleeved by the cable cover 18 between the first end 3 and the second end 5 such that the brake cable 2 is protected from external impacts.

Figure 6:
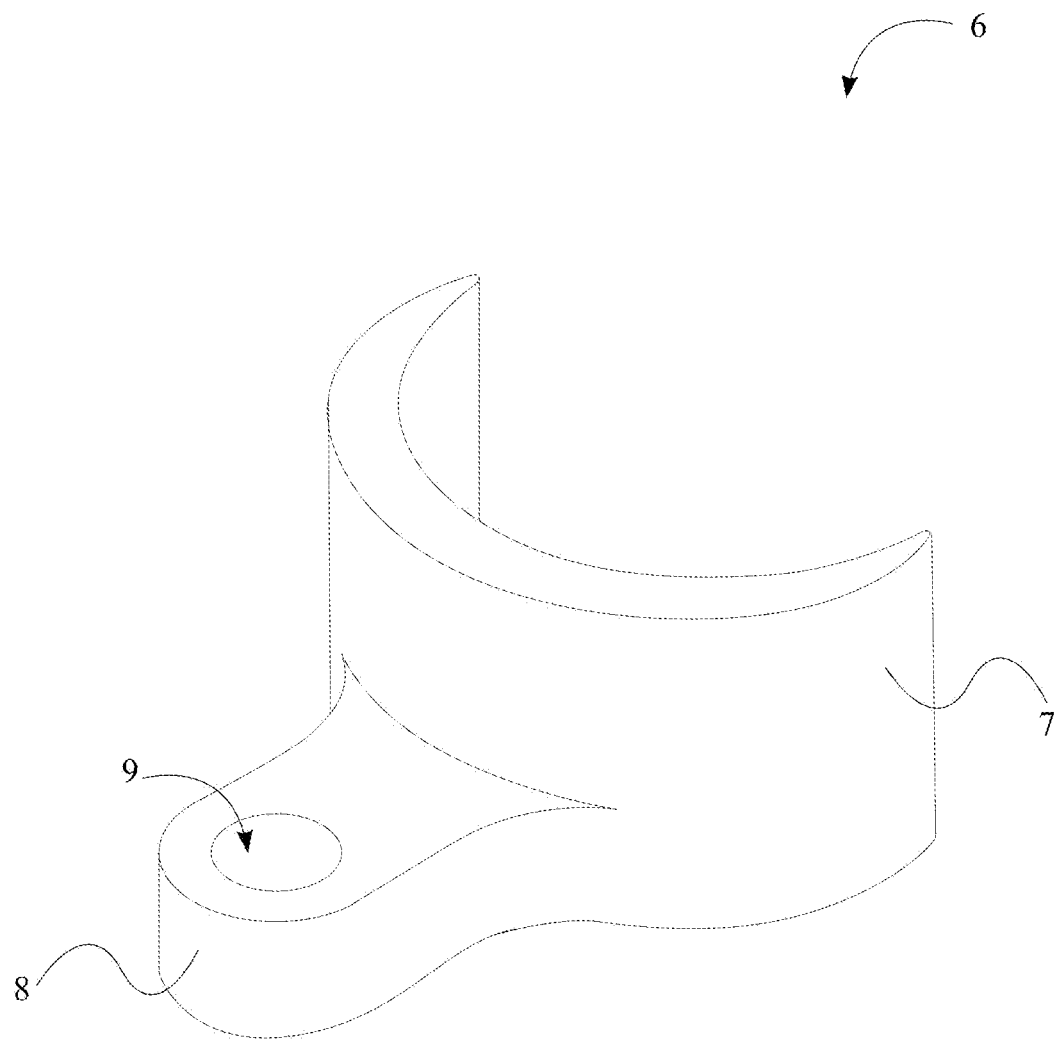
FIG. 6 is a perspective view of the cable perch.
Figure 7:
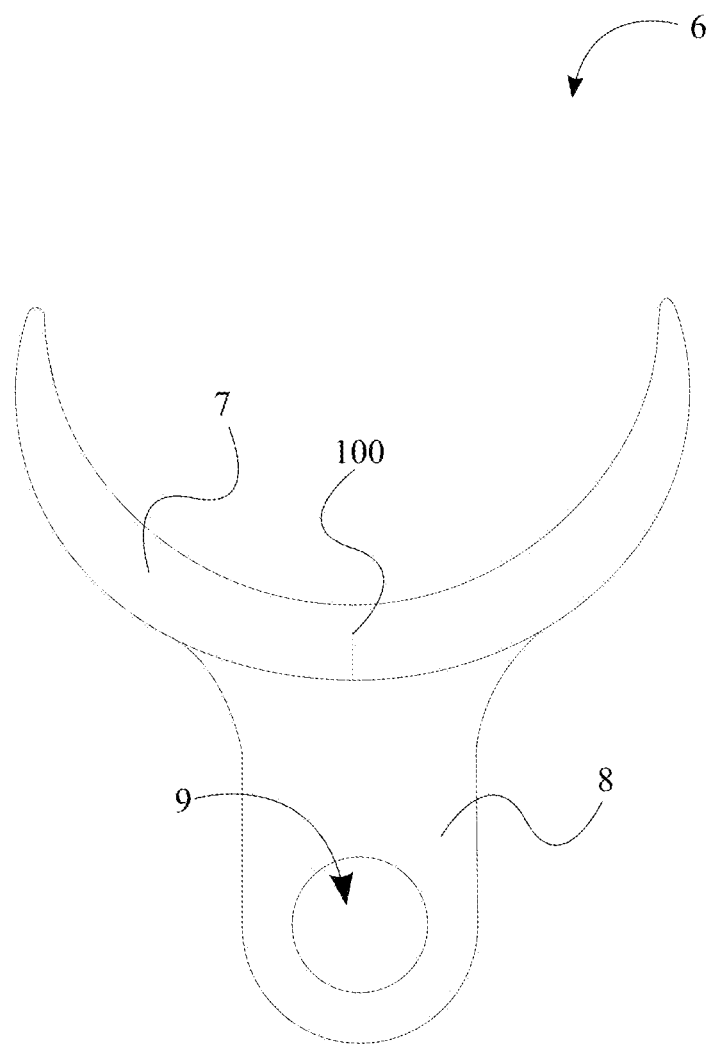
FIG. 7 is a top view of the cable perch.

As mentioned earlier, the cable perch 6 is used to position and guide the brake cable 2. The shape and size of the cable perch 6 can vary in different embodiments of the present invention. As seen in FIG. 6 and FIG. 7, the cable perch 6, which is attached to the hydraulic cylinder in the preferred embodiment comprises a perch body 7, a flange 8, and an opening 9. To be attached along the hydraulic cylinder, the perch body 7 is C-shaped in the preferred embodiment of the present invention. However, the shape of the perch body 7 can change in other embodiments of the present invention. Different fastening mechanisms, which can be, but is not limited to, a clamp and other comparable methods can be used to secure the perch body 7 at a preferred position along the hydraulic cylinder. The flange 8 is used as an extension from the perch body 7 to position and guide the brake cable 2. To do so, the flange 8 is externally connected to the perch body 7. In the preferred embodiment of the present invention, the flange 8 is connected at an apex 100 of the perch body 7. The opening 9 perpendicularly traverses through the flange 8 so that the cable body 4 can be positioned through the opening 9. When positioned through the opening 9, the brake cable 2 can move according to the action initiated by the user with the handlebar-mounted brake lever 1.

Figure 8:
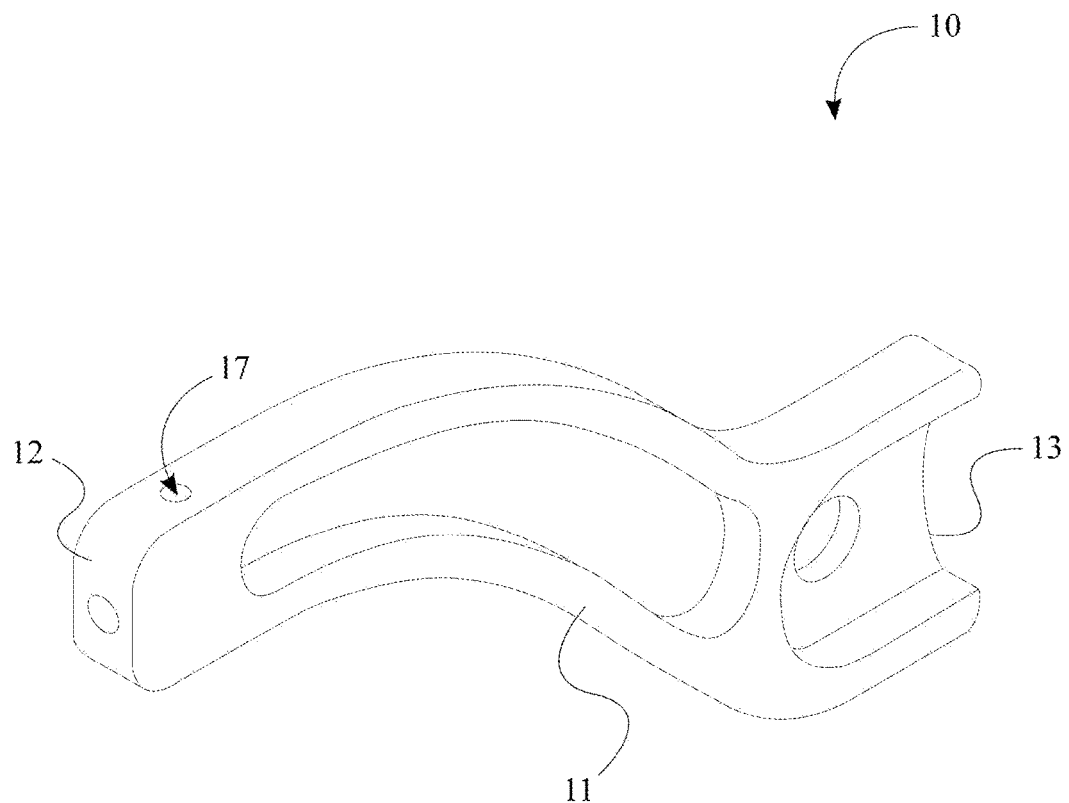
FIG. 8 is a perspective view of the cable adapter.
Figure 9:
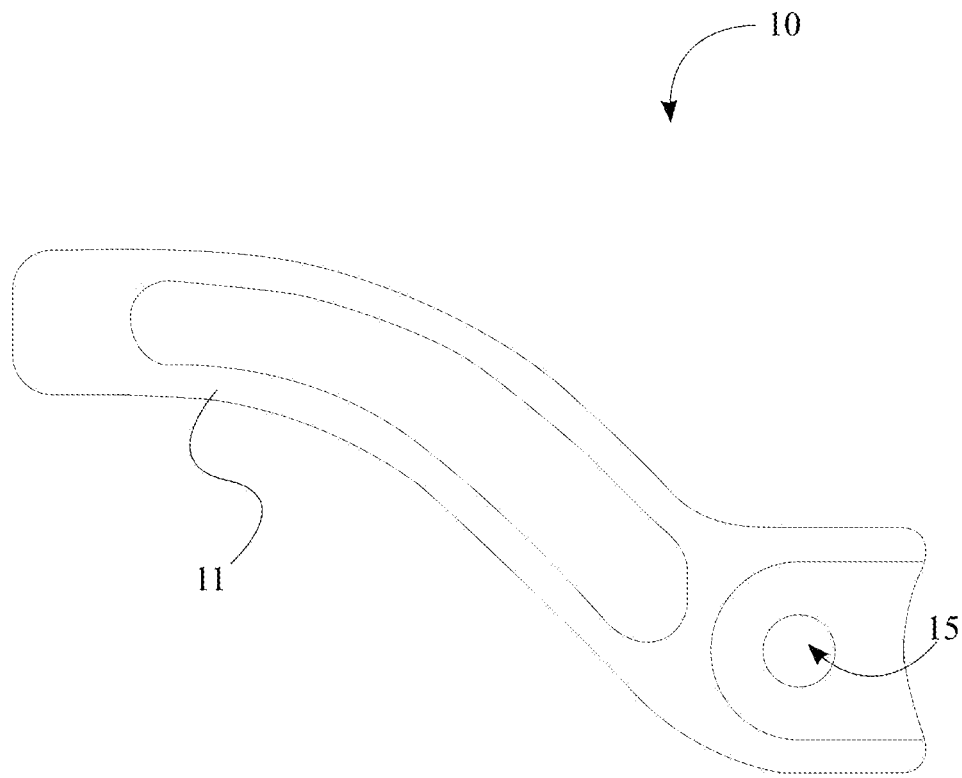
FIG. 9 is a side view of the cable adapter.

When the present invention is being used, the existing braking mechanism of the motorbike is triggered with the cable adapter 10. More specifically, the hydraulic braking system is triggered with the cable adapter 10. The size and shape of the cable adapter 10 can vary in different embodiments of the present invention. As seen in FIG. 8 and FIG. 9, the cable adapter 10 comprises a proximal end 12, a distal end 13, an adapter body 11, and a cable receiving hole 17. The adapter body 11 extends from the proximal end 12 to the distal end 13 and determines the overall length of the cable adapter 10. As mentioned before, the second end 5 of the brake cable 2 is tensionably connected to the cable adapter 10. The cable receiving hole 17 is used to position the second end 5 through the adapter body 11. To do so, the cable receiving hole 17 traverses into the adapter body 11 adjacent to the proximal end 12.

Figure 10:
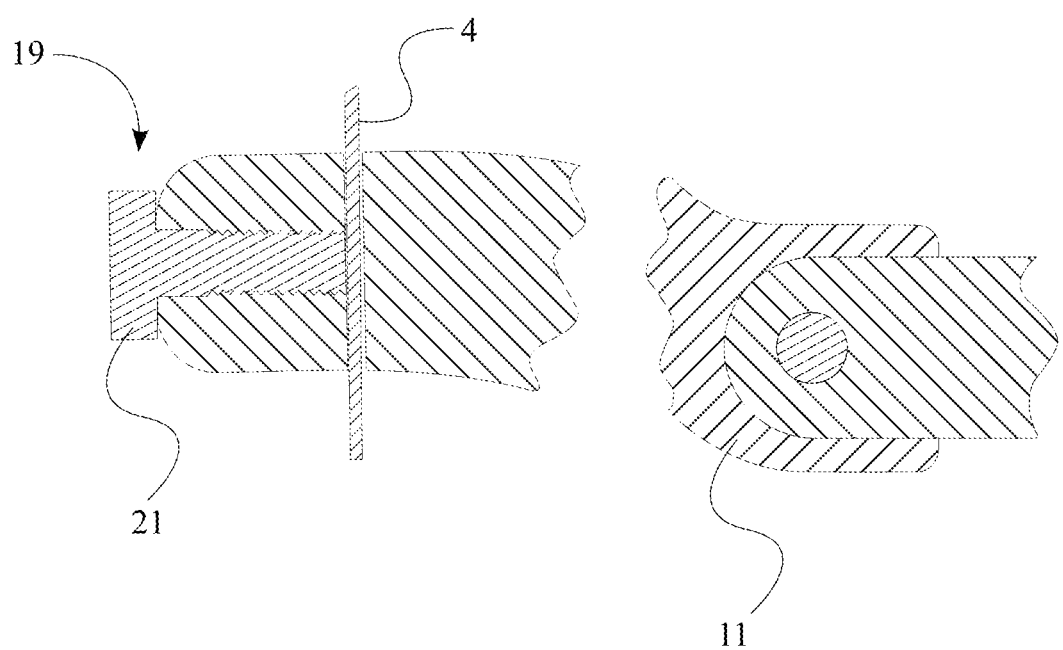
FIG. 10 is an illustration of the cable adapter, wherein a fastener bolt is used as the fastening mechanism.

To secure the cable body 4 against the adapter body 11, the present invention further comprises a fastening mechanism 19. More specifically, when the second end 5 is positioned through the cable receiving hole 17, the cable body 4 is connected to the adapter body 11 with the fastening mechanism 19. The fastening mechanism 19 can vary in different embodiments of the present invention. As seen in FIG. 1, in the preferred embodiment of the present invention, a cable clamp 20 is used as the fastening mechanism 19. The use of the cable clamp 20 allows the cable receiving hole 17 to have a considerably larger diameter than a diameter of the brake cable 2. The larger diameter prevents the brake cable 2 from being falsely triggered when the foot lever is activated. Such false triggering can result in the handlebar-mounted brake lever 1 to compress without user initiation. In another embodiment of the present invention, a fastener bolt 21 can be used to connect the brake cable 2 to the adapter body 11 as seen in FIG. 5 and FIG. 10.

The cable adapter 10 is connected to the existing braking system of the motorbike at the distal end 13. More specifically, the cable adapter 10 is connected to a piston pushrod of the hydraulic cylinder at the distal end 13. The distance between the proximal end 12 and the distal end 13 provides the necessary mechanical advantage to control the piston pushrod of the hydraulic cylinder by applying force at the proximal end 12.

Figure 5:
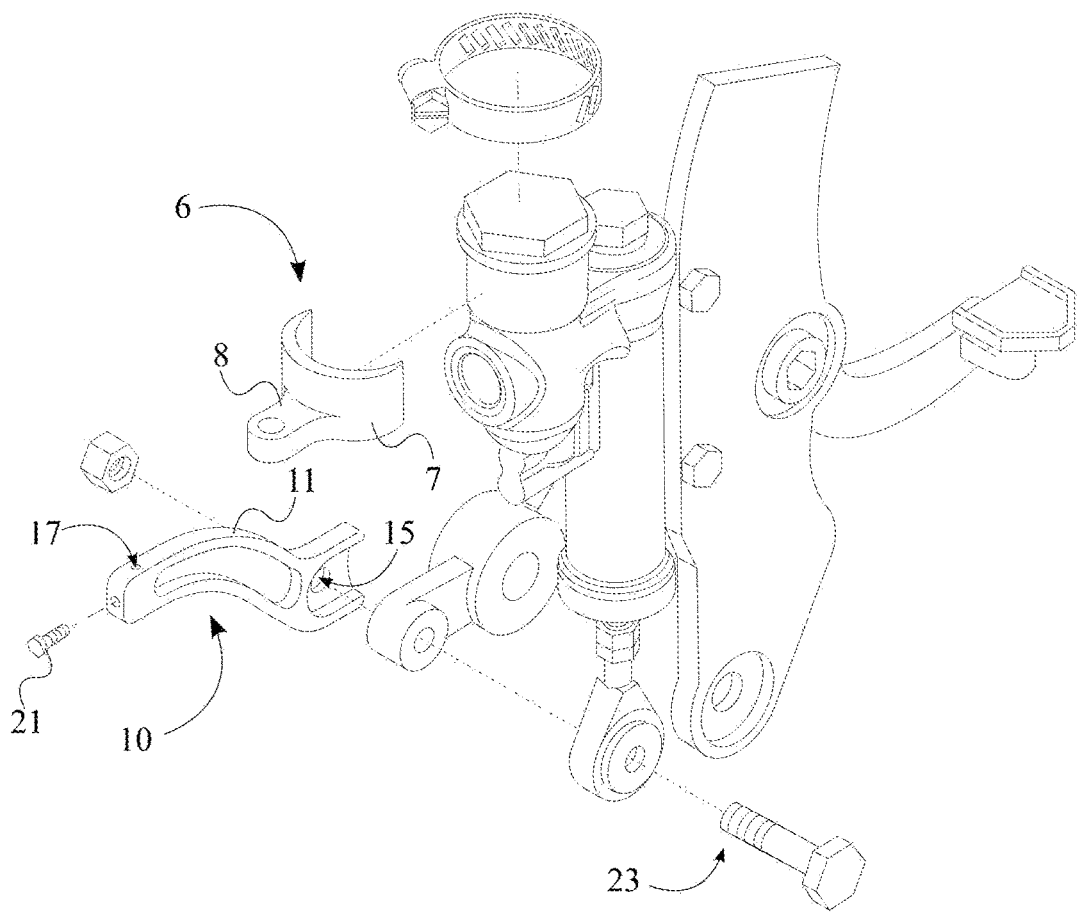

As seen in FIG. 5, the cable adapter 10 is connected to the piston pushrod of the existing hydraulic braking system with a second attachment mechanism 23. To establish a secure connection with the piston pushrod, the cable adapter 10 further comprises a pivot hole 15. The adapter body 11 is pivotably mounted to the existing braking system at the pivot hole 15. As a result, the adapter body 11 can pivot about the pivot hole 15 when the rear brake is applied or released. To do so, the pivot hole 15 traverses through the adapter body 11 adjacent the distal end 13. The cable adapter 10 is mounted to the existing braking system by driving a bolt or other comparable fastener through the pivot hole 15.

When the present invention is in use, the handlebar-mounted brake lever 1 is mounted adjacent the left-hand handle grip with the first attachment mechanism 22. The cable perch 7 is attached along the hydraulic cylinder of the existing braking system. The cable adapter 10 is also mounted onto the existing braking system with the second attachment mechanism 23. The first end 3 of the brake cable 2 is connected to the handlebar-mounted brake lever 1, and the second end 5 of the brake cable 2 is connected to the cable adapter 10 such that the cable body 4 passes through the opening 9 of the cable perch 7. When the user intends on applying the rear brakes via the present invention, the handlebar-mounted brake lever 1 is compressed so that the cable adapter 10 pivots about the pivot hole 15. As a result, the existing hydraulic braking system is triggered and the rear brakes are applied.

Although the invention has been explained in relation to its preferred embodiment, it is to be understood that many other possible modifications and variations can be made without departing from the spirit and scope of the invention as hereinafter claimed.

What is claimed is:
1. A cable operated left-hand rear brake system for motorbikes comprises:
   a handlebar-mounted brake lever;
   a brake cable;
   a cable perch;
   a cable adapter;
   the brake cable comprises a first end, a cable body, and a second end;
   the cable body extending from the first end to the second end;
   the first end being tensionably connected to the handlebar-mounted brake lever;
   the second end being tensionably connected to the cable adapter via the cable perch;
   the handlebar-mounted brake lever being mechanically engaged with the cable adapter;
   the cable adapter comprises a proximal end, a distal end, an adapter body, and a cable receiving hole;
   the adapter body extending from the proximal end to the distal end;
   the cable receiving hole traversing into the adapter body adjacent to the proximal end; and the second end of the brake cable being positioned through the cable receiving hole.

2. The cable operated left-hand rear brake system for motorbikes as claimed in claim 1 further comprises:
   the cable perch comprises a perch body, a flange, and an opening;
   the flange being externally connected to the perch body;
   the opening perpendicularly traversing through the flange; and
   the cable body being positioned through the opening.

3. The cable operated left-hand rear brake system for motorbikes as claimed in claim 2, wherein the perch body is C-shaped.

4. The cable operated left-hand rear brake system for motorbikes as claimed in claim 2, wherein the flange is connected at an apex of the perch body.

5. The cable operated left-hand rear brake system for motorbikes as claimed in claim 1 further comprises:
   a fastening mechanism; and
   the cable body being connected to the adapter body with the fastening mechanism.

6. The cable operated left-hand rear brake system for motorbikes as claimed in claim 1 further comprises:
   the cable adapter further comprises a pivot hole; and
   the pivot hole centrally traversing through the adapter body adjacent to the distal end.

7. The cable operated left-hand rear brake system for motorbikes as claimed in claim 1 further comprises:
   a cable cover; and
   the cable body being sleeved by the cable cover between the first end and the second end.

8. The cable operated left-hand rear brake system for motorbikes as claimed in claim 1 further comprises:
   a first attachment mechanism;
   a handlebar; and
   the handlebar-mounted brake lever being mounted onto the handlebar with the first attachment mechanism.

9. The cable operated left-hand rear brake system for motorbikes as claimed in claim 1 further comprises:
   a second attachment mechanism;
   a piston pushrod; and
   the cable adapter being connected to the piston pushrod with the second attachment mechanism.

\* \* \* \* \*